(12) United States Patent
Hashimoto et al.

(10) Patent No.: US 9,842,079 B2
(45) Date of Patent: Dec. 12, 2017

(54) COMMUNICATION APPARATUS, COMMUNICATION METHOD, AND COMPUTER READABLE MEDIUM

(71) Applicant: Mitsubishi Electric Corporation, Chiyoda-ku (JP)

(72) Inventors: Masanori Hashimoto, Tokyo (JP); Yasuomi Ando, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/116,458

(22) PCT Filed: Feb. 5, 2014

(86) PCT No.: PCT/JP2014/052633
§ 371 (c)(1),
(2) Date: Aug. 3, 2016

(87) PCT Pub. No.: WO2015/118629
PCT Pub. Date: Aug. 13, 2015

(65) Prior Publication Data
US 2017/0010998 A1 Jan. 12, 2017

(51) Int. Cl.
*G06F 13/42* (2006.01)
*G06F 13/40* (2006.01)
*G06F 13/38* (2006.01)

(52) U.S. Cl.
CPC ........ *G06F 13/4068* (2013.01); *G06F 13/385* (2013.01); *G06F 13/4265* (2013.01)

(58) Field of Classification Search
CPC .................... G06F 13/4068; G06F 13/385
(Continued)

(56) References Cited

U.S. PATENT DOCUMENTS 8,155,900 B1 * 4/2012 Adams ................ F24F 11/0012
702/62
9,618,967 B2 * 4/2017 Brown .................. G06F 1/1605
(Continued)

FOREIGN PATENT DOCUMENTS

JP 04-106351 A 4/1992
JP 09-133388 A 5/1997
(Continued)

OTHER PUBLICATIONS

International Search Report dated Mar. 11, 2014 for PCT/JP2014/052633 filed on Feb. 5, 2014.
(Continued)

*Primary Examiner* — Paul R Myers
(74) *Attorney, Agent, or Firm* — Oblon, McClelland, Maier & Neustadt, L.L.P.

(57) ABSTRACT

A gateway apparatus (103) receives a request frame transmitted from a system controller (101) to an indoor unit 1 (111), and determines whether a sensor specified in the request frame is a sensor 1-A (121) which is connected with the indoor unit 1 (111) or a sensor 1-B (123) which is not connected with the indoor unit 1 (111). When the sensor specified in the request frame is the sensor 1-B (123), the gateway apparatus (103) acquires a measurement value from the sensor 1-B (123), and responds to the system controller (101) with the acquired measurement value of the sensor 1-B (123).

6 Claims, 8 Drawing Sheets

(58) Field of Classification Search
USPC .......................................................... 710/106
See application file for complete search history.

(56) References Cited

U.S. PATENT DOCUMENTS

| | | | | |
|---|---|---|---|---|
| 2008/0288662 | A1* | 11/2008 | Doorenbos | G06F 13/4291 710/4 |
| 2010/0328143 | A1* | 12/2010 | Kirk | G01W 1/04 342/26 B |
| 2012/0083911 | A1* | 4/2012 | Louboutin | G06F 1/1632 700/94 |
| 2012/0246261 | A1* | 9/2012 | Roh | G06F 13/385 709/217 |
| 2013/0300578 | A1* | 11/2013 | Uchida | A61B 5/0022 340/870.02 |

FOREIGN PATENT DOCUMENTS

| | | |
|---|---|---|
| JP | 2002-286279 A | 10/2002 |
| JP | 2010-278569 A | 12/2010 |
| JP | 2012-013311 A | 1/2012 |
| JP | 2012-065071 A | 3/2012 |
| WO | WO 2013/065327 A1 | 5/2013 |

OTHER PUBLICATIONS

Supplementary European Search Report dated Sep. 29, 2017 in Application No. 14882058.2

* cited by examiner

Fig. 3

| MANAGEMENT TABLE | | |
|---|---|---|
| DEVICE | ADDRESS | SENSOR NUMBER |
| INDOOR UNIT 1 | 1 | 1-B<br>1-C |
| INDOOR UNIT 2 | 2 | 2-B<br>2-C |
| .. | | |

COMMUNICATION APPARATUS, COMMUNICATION METHOD, AND COMPUTER READABLE MEDIUM

TECHNICAL FIELD

The present invention relates to a system using a measurement value of a sensor.

BACKGROUND ART

Hereinafter, an air-conditioning system for building will be described as an example of system using a measurement value of a sensor.

In the air-conditioning system for building, a system controller, an outdoor unit, and an indoor unit are connected with a network.

The system controller manages and controls the outdoor unit and the indoor unit to perform air-conditioning control of a space.

The system controller uses a temperature measured by a sensor (for example, a temperature of suction air of the indoor unit) for detailed air-conditioning control.

In future, in order to implement further-energy-saving control and detailed comfort control, it is necessary to collect much more sensor information and to improve a degree of freedom of an installation place of a sensor.

As a technique using temperature information measured by a plurality of sensors for air-conditioning control, for example, Patent Literature 1 discloses such a technique.

CITATION LIST

Patent Literature

Patent Literature 1: JP 2012-013311 A

SUMMARY OF INVENTION

Technical Problem

In Patent Literature 1, a temperature sensor is mounted on each indoor unit.

Furthermore, an information supplying apparatus is connected with each indoor unit.

A plurality of temperature sensors is mounted on each information supplying apparatus, temperature information by the temperature sensors of the information supplying apparatus is supplied from the information supplying apparatus to the indoor unit.

In Patent Literature 1, the information supplying apparatus needs to be connected with each indoor unit, and the system configuration can be complicated.

Furthermore, a circuit to connect the indoor unit with the information supplying apparatus needs to be added to the indoor unit.

Moreover, a function to select the temperature information from the temperature sensor mounted on the indoor unit or the temperature information supplied from the information supplying apparatus needs to be added to the indoor unit.

The present invention has been made in view of such a situation, and a main object thereof is to implement a configuration capable of using measurement values of a plurality of sensors without complicating a system configuration and adding a special circuit or function to an device.

Solution to Problem

A communication apparatus according to the present invention is included in a network in which a device and a collection apparatus to collect a measurement value of a physical quantity used by the device are connected with each other, and the communication apparatus includes:

a reception unit to receive a measurement value transmission request which has been transmitted from the collection apparatus to the device, and specifies either of a connection sensor and a non-connection sensor and requests the device to transmit a measured value of the sensor specified to the collection apparatus, the connection sensor measuring a physical quantity used by the device and being connected to the device, the non-connection sensor measuring a physical quantity used by the device and not being connected to the device;

a sensor determination unit to determine whether the non-connection sensor is specified in the measurement value transmission request;

a measurement value acquisition unit to acquire, when the sensor determination unit has determined that the non-connection sensor is specified in the measurement value transmission request, a measurement value of the non-connection sensor from the non-connection sensor; and a transmission unit to transmit, to the collection apparatus, the measurement value of the non-connection sensor acquired by the measurement value acquisition unit in response to the measurement value transmission request.

Advantageous Effects of Invention

In the present invention, when a non-connection sensor is requested in a measurement value transmission request, a communication apparatus acquires a measurement value from the non-connection sensor and transmits the measurement value of the non-connection sensor to a collection apparatus.

Thus, according to the present invention, an information supplying apparatus does not need to be connected with each apparatus, and it is possible to use a measurement value of a sensor without complicating a system configuration and adding a special circuit and function to a device.

BRIEF DESCRIPTION OF DRAWINGS

FIG. 3 is a diagram illustrating an example of a management table held by a gateway apparatus according to the first embodiment.

DESCRIPTION OF EMBODIMENTS

First Embodiment

Hereinafter, a sensor information collection system according to the present embodiment will be described.

In the present embodiment, a sensor information collection system which collects sensor information for air-conditioning will be described.

Figure 1:
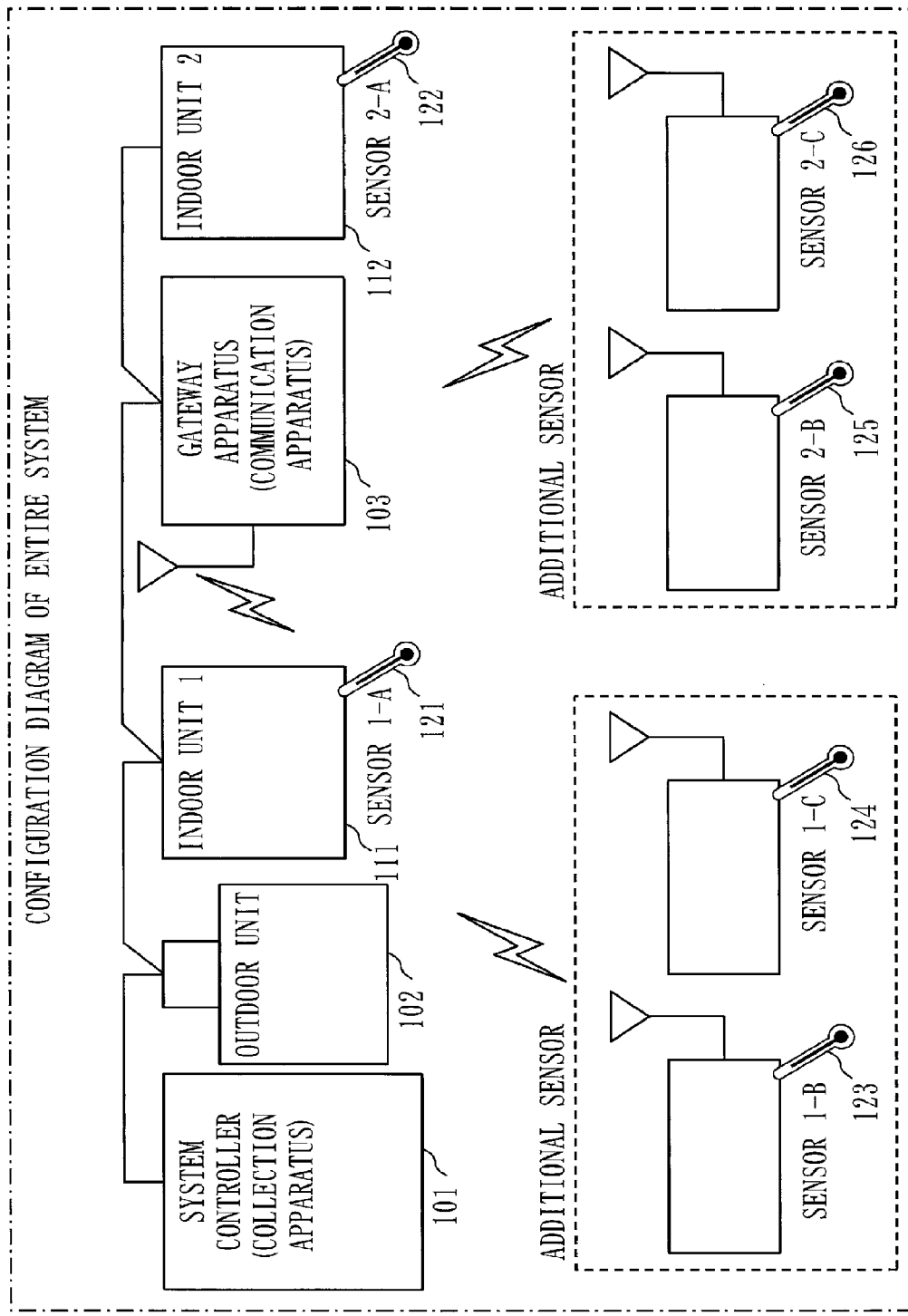
FIG. 1 is a diagram illustrating an example of a system configuration according to a first embodiment.

FIG. 1 illustrates a configuration example of a sensor information collection system according to the present embodiment.

In the sensor information collection system according to the present embodiment, an air-conditioning network (100), a system controller (101), an outdoor unit (102), an indoor unit 1 (111), an indoor unit 2 (112), and a gateway apparatus (103) are connected with each other by a dedicated communication line.

Each of the outdoor unit (102), the indoor unit 1 (111), and the indoor unit 2 (112) is also referred to as a device.

Furthermore, the system controller (101) is equivalent to an example of a collection apparatus, and the gateway apparatus (103) is equivalent to an example of a communication apparatus.

The indoor unit 1 (111) is directly connected with a sensor 1-A (121) dedicated to detecting a suction air temperature as an indoor temperature.

Furthermore, the indoor unit 2 (112) is also directly connected with a sensor 2-A (122) dedicated to detecting a suction air temperature as an indoor temperature.

Moreover, a sensor 1-B (123) and a sensor 1-C (124) which are capable of wireless communication are installed in a target space which is a space of an air-conditioning control target.

The sensor 1-B (123) and the sensor 1-C (124) measure temperature used by the indoor unit 1 (111).

For example, the sensor 1-B (123) and the sensor 1-C (124) are installed in the vicinity of the indoor unit 1 (111), and measure temperature, other than the suction air temperature, used by the indoor unit 1 (111).

Similarly, a sensor 2-B (125) and a sensor 2-C (126) which are capable of wireless communication are installed in a target space.

The sensor 2-B (125) and the sensor 2-C (126) measure temperature used by the indoor unit 2 (112).

For example, the sensor 2-B (125) and the sensor 2-C (126) are installed in the vicinity of the indoor unit 2 (112), and measure temperature, other than the suction air temperature, used by the indoor unit 2 (112).

The sensor 1-A (121) and the sensor 2-A (122) are equivalent to an example of a connection sensor, and the sensor 1-B (123), the sensor 1-C (124), the sensor 2-B (125), and the sensor 2-C (126) are equivalent to an example of a non-connection sensor.

Furthermore, the sensor 1-B (123), the sensor 1-C (124), the sensor 2-B (125), and the sensor 2-C (126) are referred to as additional sensors.

The gateway apparatus (103) is included in the air-conditioning network (100) and capable of wirelessly communicating with the sensor 1-B (123), the sensor 1-C (124), the sensor 2-B (125), and the sensor 2-C (126). The gateway apparatus (103) collects temperature information from the sensor 1-B (123), the sensor 1-C (124), the sensor 2-B (125), and the sensor 2-C (126).

Note that, the gateway apparatus (103) is also simply described as a gateway.

Figure 2:
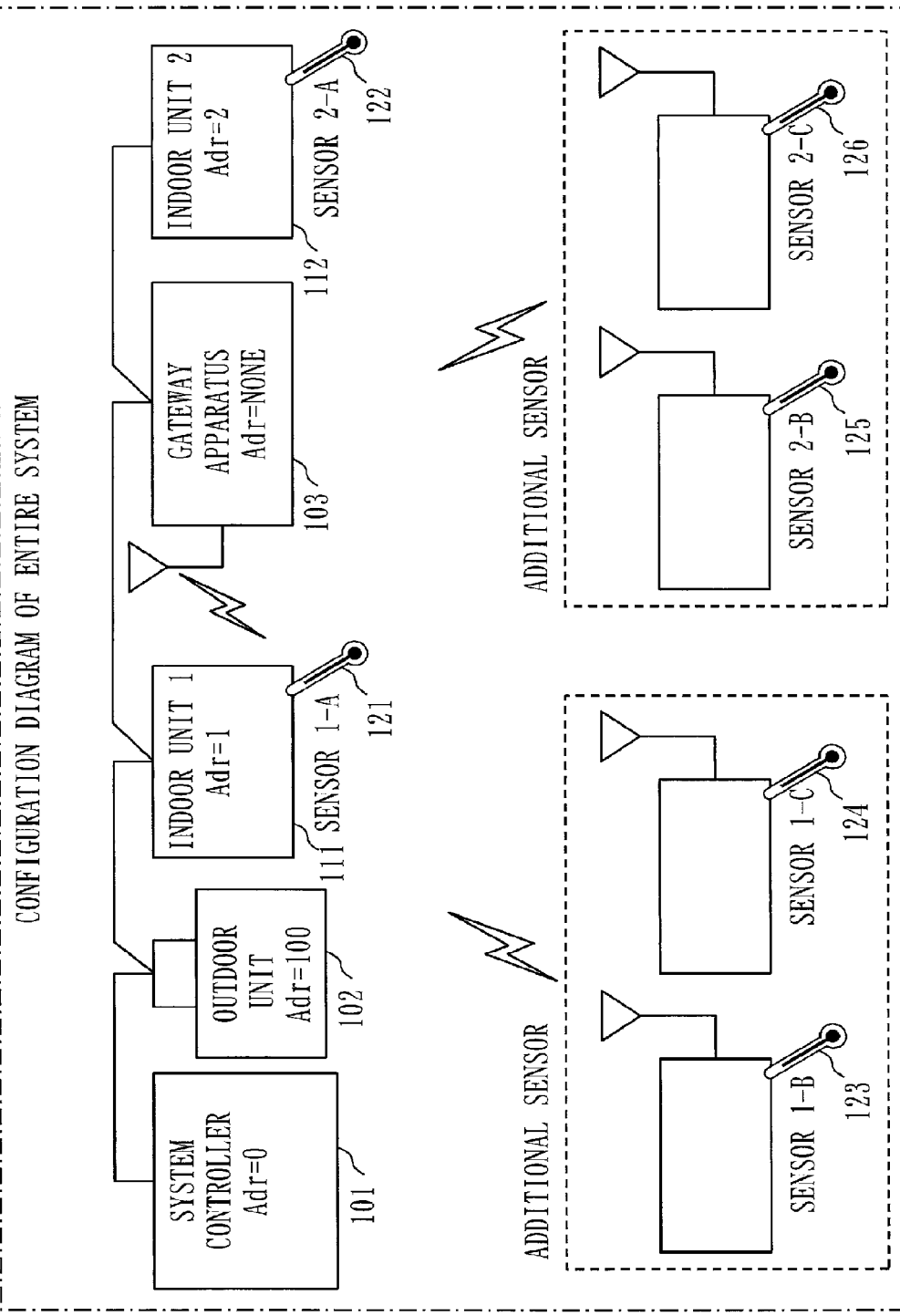
FIG. 2 is a diagram illustrating an example of address assignment according to the first embodiment.

Next, an example of address assignment in the air-conditioning network (100) will be described with reference to FIG. 2.

To communicate in the air-conditioning network (100), a unique address is assigned to each of the system controller (101), the outdoor unit (102), the indoor unit 1 (111), and the indoor unit 2 (112).

Specifically, address=0 is assigned to the system controller (101).

Address=100 is assigned to the outdoor unit (102).
Address=1 is assigned to the indoor unit 1 (111).
Address=2 is assigned to the indoor unit 2 (112).

Note that, no address is assigned to the gateway apparatus (103).

In the air-conditioning system, based on a set temperature set by the system controller (101) and the indoor temperature acquired from the sensor 1-A (121) and the sensor 2-A (122), the system controller (101) controls the air-conditioning of the target space in cooperation with the outdoor unit (102).

Furthermore, the system controller (101) performs, using the temperature information of the sensor 1-A (121) and the sensor 2-A (122), integrated control for an energy-saving operation of the entire air-conditioning system.

Moreover, the system controller (101) may use, for the air-conditioning control and the integrated control, the temperature information of the sensor 1-B (123), the sensor 1-C (124), the sensor 2-B (125), and the sensor 2-C (126).

Note that, the system controller (101) does not recognize that the sensor 1-B (123) and the sensor 1-C (124) are not connected with the indoor unit 1 (111).

Thus, the system controller (101) transmits, to the indoor unit 1 (111), all of a request frame which requests the sensor 1-A (121) to transmit the temperature information, a request frame which requests the sensor 1-B (123) to transmit the temperature information, and a request frame which requests the sensor 1-C (124) to transmit the temperature information.

Then, the temperature information of the sensor 1-A (121) is transmitted from the indoor unit 1 (111) to the system controller (101), and the temperature information of the sensor 1-B (123) and the temperature information of the sensor 1-C (124) are transmitted from the gateway apparatus (103) to the system controller (101).

Similarly, the system controller (101) does not recognize that the sensor 2-B (125) and the sensor 2-C (126) are not connected with the indoor unit 2 (112).

Thus, the system controller (101) transmits, to the indoor unit 2 (112), all of a request frame which requests the sensor 2-A (122) to transmit the temperature information, a request frame which requests the sensor 2-B (125) to transmit the temperature information, and a request frame which requests the sensor 2-C (126) to transmit the temperature information.

Then, the temperature information of the sensor 2-A (122) is transmitted from the indoor unit 2 (112) to the system controller (101), and the temperature information of the sensor 2-B (125) and the temperature information of the sensor 2-C (126) are transmitted from the gateway apparatus (103) to the system controller (101).

Next, the procedure in which the system controller (101) (address=0) acquires the temperature information of the sensor 1-A (121) from the indoor unit 1 (111) (address=1) will be detailedly described.

1) The system controller (101) transmits, to the air-conditioning network (100), a request frame to acquire the temperature information from the sensor 1-A (121) connected with the indoor unit 1 (111).

The request frame is equivalent to an example of a measurement value transmission request.

Note that, in the request frame, SrcAddr (transmission source address)=0, DstAddr (transmission destination address)=1 are described in the header part.

2) The indoor unit 1 (111) receives the request frame, and transmits an arrival confirmation frame (ACK) to the system controller (101).

The arrival confirmation frame (ACK) is a communication frame to notify the system controller (101) that the indoor unit 1 (111) has received the request frame, and equivalent to an example of a reception confirmation notification.

3) The system controller (101) recognizes, by receiving the arrival confirmation frame (ACK), that the request frame has arrived at the indoor unit 1 (111).

4) The indoor unit 1 (111) acquires the temperature information from the sensor 1-A (121), and transmits a response frame to the air-conditioning network (100).

In the response frame, SrcAddr=1 and DstAddr=0 are described in the header part, and the temperature information of the sensor 1-A (121) is described in the payload part.

5) The system controller (101) receives the response frame, and transmits an arrival confirmation frame (ACK) to the indoor unit 1 (111).

Next, the gateway apparatus (103) will be described.

The gateway apparatus (103) holds a management table indicating the association of additional sensors with indoor units (FIG. 3) in advance.

As illustrated in FIG. 3, the management table indicates that the indoor unit 1 (111) is associated with the sensor 1-B (123) and the sensor 1-C (124), and that the indoor unit 2 (112) is associated with the sensor 2-B (125) and the sensor 2-C (126).

The gateway apparatus (103) has no unique address, and does not receive any communication frames addressed to the gateway apparatus (103).

The gateway apparatus (103) monitors all of the communication frames transmitted and received in the air-conditioning network (100).

Furthermore, the gateway apparatus (103) collects the temperature information of the additional sensors by wireless communication.

Figure 7:
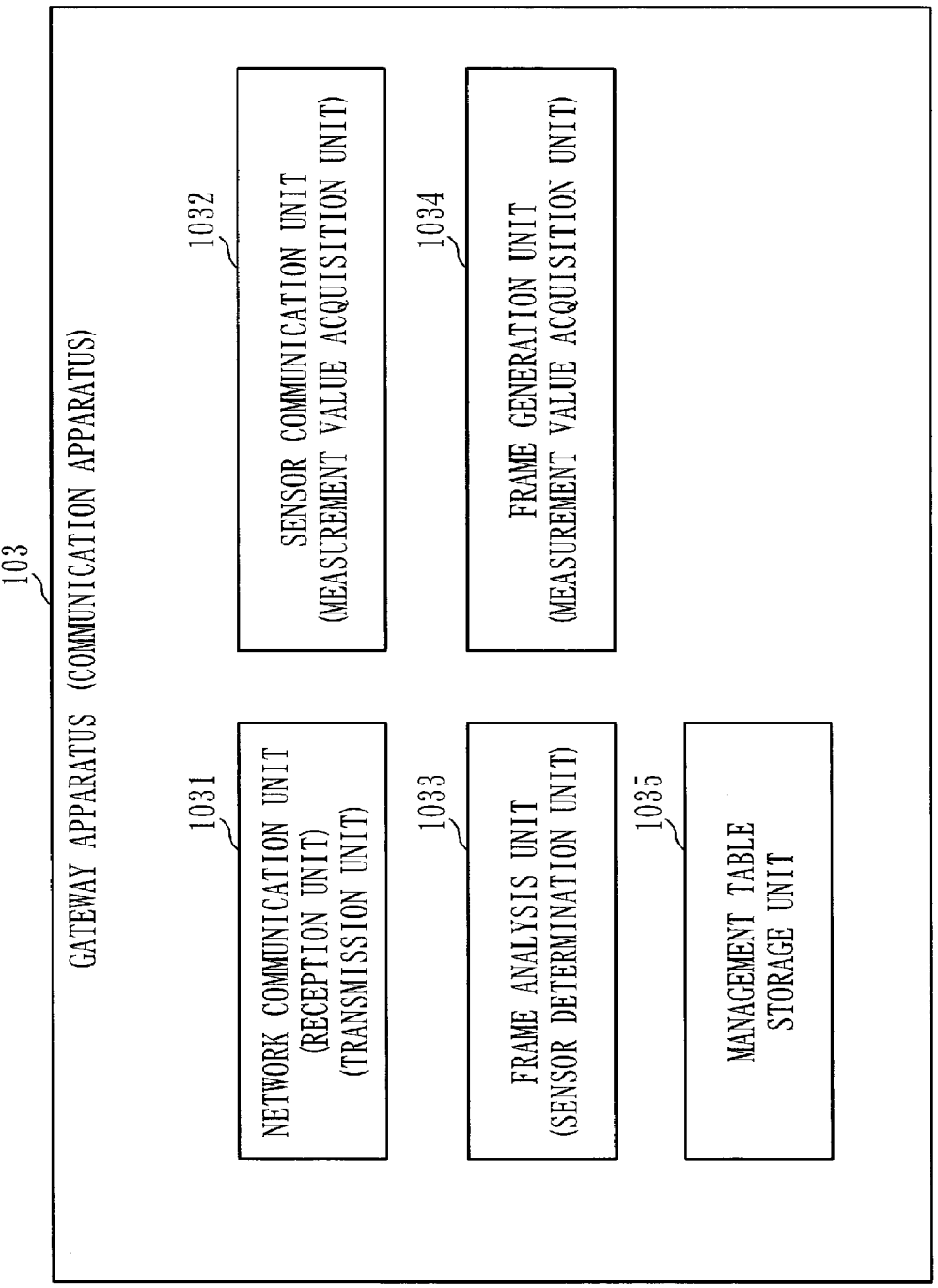
FIG. 7 is a diagram illustrating an example of a functional configuration of the gateway apparatus according to the first embodiment.

FIG. 7 illustrates an example of a functional configuration of the gateway apparatus (103).

In FIG. 7, a network communication unit (1031) communicates with the air-conditioning network (100).

More specifically, the network communication unit (1031) receives the request frame and the arrival confirmation frame (ACK) from the system controller (101) to the indoor unit 1 (111), and the request frame and the arrival confirmation frame (ACK) from the system controller (101) to the indoor unit 2 (112).

Similarly, the network communication unit (1031) receives the response frame and the arrival confirmation frame (ACK) from the indoor unit 1 (111) to the system controller (101), and the response frame and the arrival confirmation frame (ACK) from the indoor unit 2 (112) to the system controller (101).

Furthermore, when the request frame from the system controller (101) requests the transmission of the temperature information of the additional sensors, a response frame in which the temperature information of the additional sensors is described is transmitted to the system controller (101).

The network communication unit (1031) is equivalent to examples of a reception unit and a transmission unit.

A sensor communication unit (1032) wirelessly communicates with the additional sensors.

More specifically, the sensor communication unit (1032) transmits an instruction frame to instruct the additional sensors to transmit the temperature information, and receives a notification frame to notify the temperature information from the additional sensors.

The sensor communication unit (1032) and a frame generation unit (1034), which will be described later, are equivalent to an example of a measurement value acquisition unit.

A frame analysis unit (1033) analyzes the request frame received by the network communication unit (1031), and determines that which sensor is the sensor specified in the request frame.

When the sensor specified in the request frame is the sensor 1-A (121) or the sensor 2-A (122), the frame analysis unit (1033) does not perform the subsequent processing.

On the other hand, when the sensor specified in the request frame is any one of the sensor 1-B (123), the sensor 1-B (123), the sensor 2-B (125), and the sensor 2-C (126), the frame analysis unit (1033) instructs the frame generation unit (1034) to generate an instruction frame.

The frame analysis unit (1033) is equivalent to an example of a sensor determination unit.

The frame generation unit (1034) generates a communication frame.

More specifically, when being instructed to generate the instruction frame by the frame analysis unit (1033), the frame generation unit (1034) generates the instruction frame, and forwards the generated instruction frame to the sensor communication unit (1032).

Furthermore, when the sensor communication unit (1032) receives the notification frame from the additional sensors, the frame generation unit (1034) generates the response frame in which the temperature information included in the notification frame is described.

The frame generation unit (1034) and the sensor communication unit (1032) are equivalent to an example of a measurement value acquisition unit.

The management table storage unit (1035) stores the management table exemplified in FIG. 3.

Figure 4:
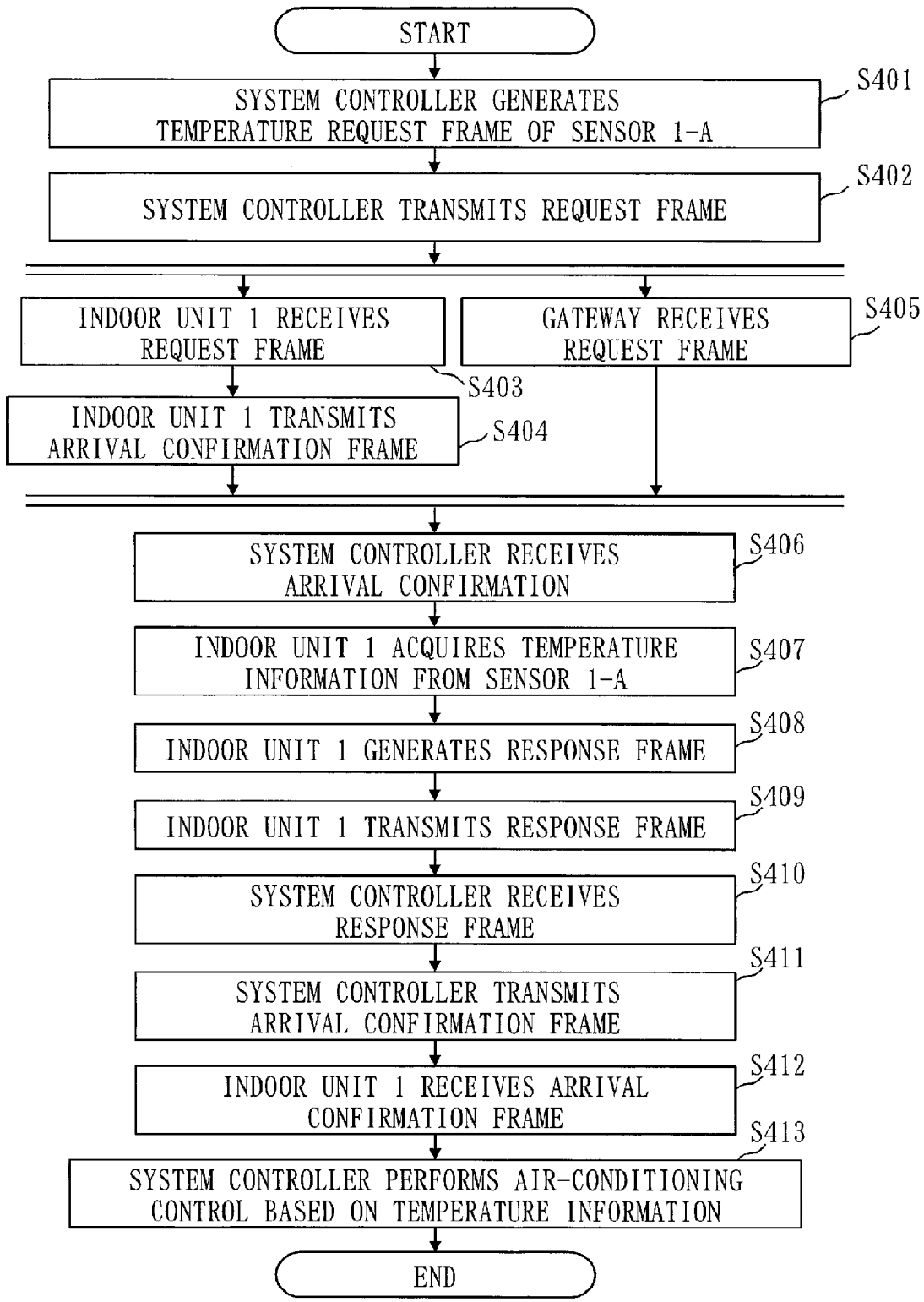
FIG. 4 is a flowchart illustrating a procedure for collecting a measurement value of a sensor 1-A according to the first embodiment.

Next, operational examples when the system controller (101) acquires the temperature information from the indoor unit 1 (111) will be described with reference to the flowchart of FIG. 4.

Here, the operational examples when the system controller (101) acquires the temperature information of the sensor 1-A (121) from the indoor unit 1 (111) will be described.

First, in step 401, to acquire the temperature information of the sensor 1-A (121), the system controller (101) generates a request frame in which SrcAddr=0 and DstAddr=1 are described in the header part.

Next, in step 402, the system controller (101) transmits the request frame to the air-conditioning network (100).

For example, the system controller (101) broadcasts the request frame.

Next, in step 403, the indoor unit 1 (111) receives the request frame.

Next, in step 404, the indoor unit 1 (111) transmits an arrival confirmation frame (ACK) to the air-conditioning network (100).

Furthermore, in step 405 in parallel with step 403, the network communication unit (1031) of the gateway apparatus (103) receives the request frame.

Then, the frame analysis unit (1033) analyzes the request frame, but does nothing since the request frame is addressed to the sensor 1-A (121).

Next, in step 406, the system controller (101) receives the arrival confirmation frame (ACK), and confirms that the request frame has been delivered to the indoor unit 1 (111).

Next, in step 407, the indoor unit 1 (111) acquires the temperature information from the sensor 1-A (121).

Next, in step 408, the indoor unit 1 (111) generates a response frame in which SrcAddr=1 and DstAddr=0 are described in the header part and the temperature information is described in the payload part.

Next, in step 409, the indoor unit 1 (111) transmits the response frame to the air-conditioning network (100).

Next, in step 410, the system controller (101) receives the response frame.

Next, in step 411, the system controller (101) transmits an arrival confirmation frame (ACK) to the air-conditioning network (100).

Next, in step 412, the indoor unit 1 (111) receives the arrival confirmation frame (ACK).

Finally, in step 413, the system controller (101) performs the air-conditioning control based on the temperature information acquired from the received response frame.

Figure 5:
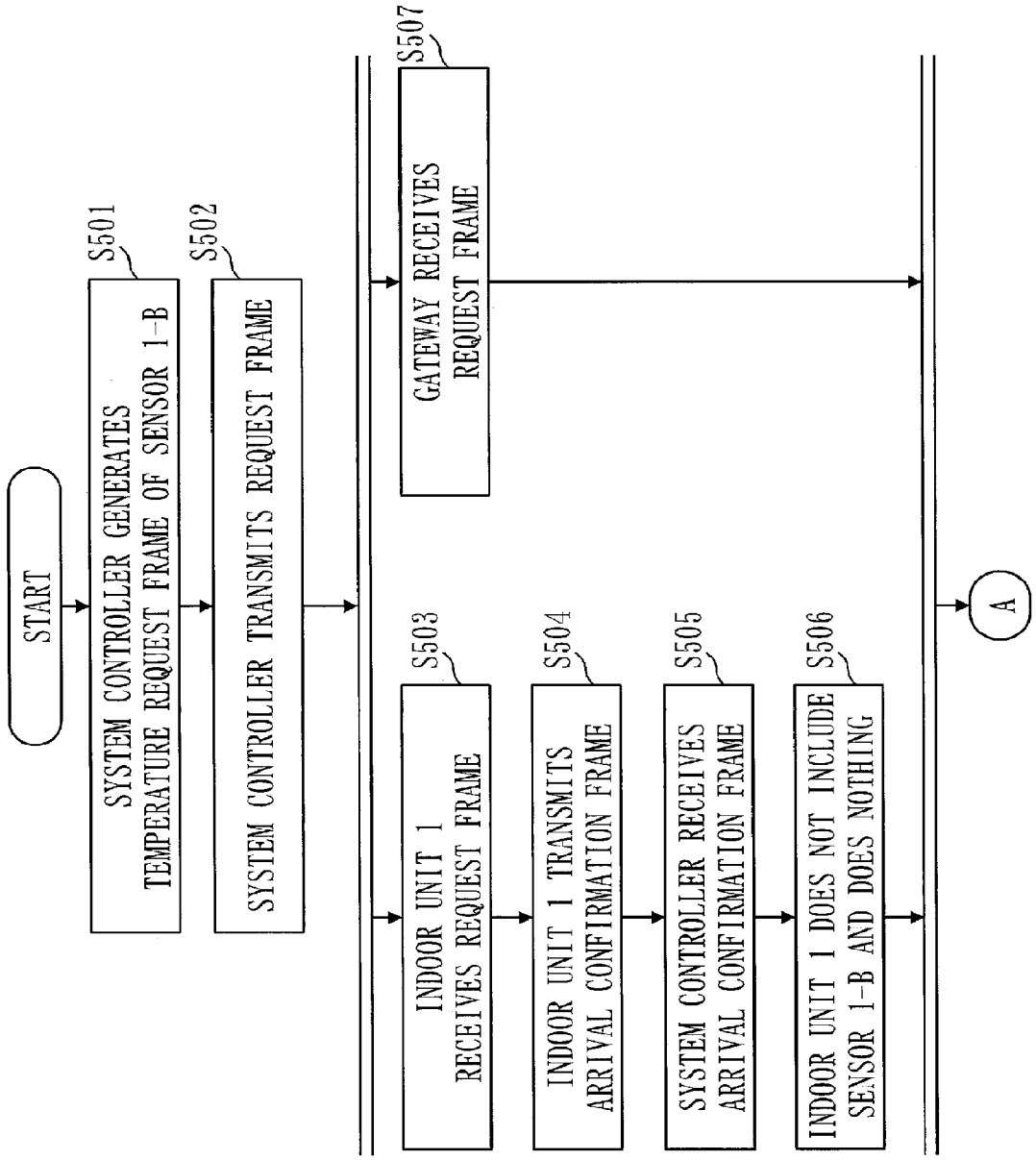
FIG. 5 is a flowchart illustrating a procedure for collecting a measurement value of a sensor 1-B according to the first embodiment.
Figure 6:
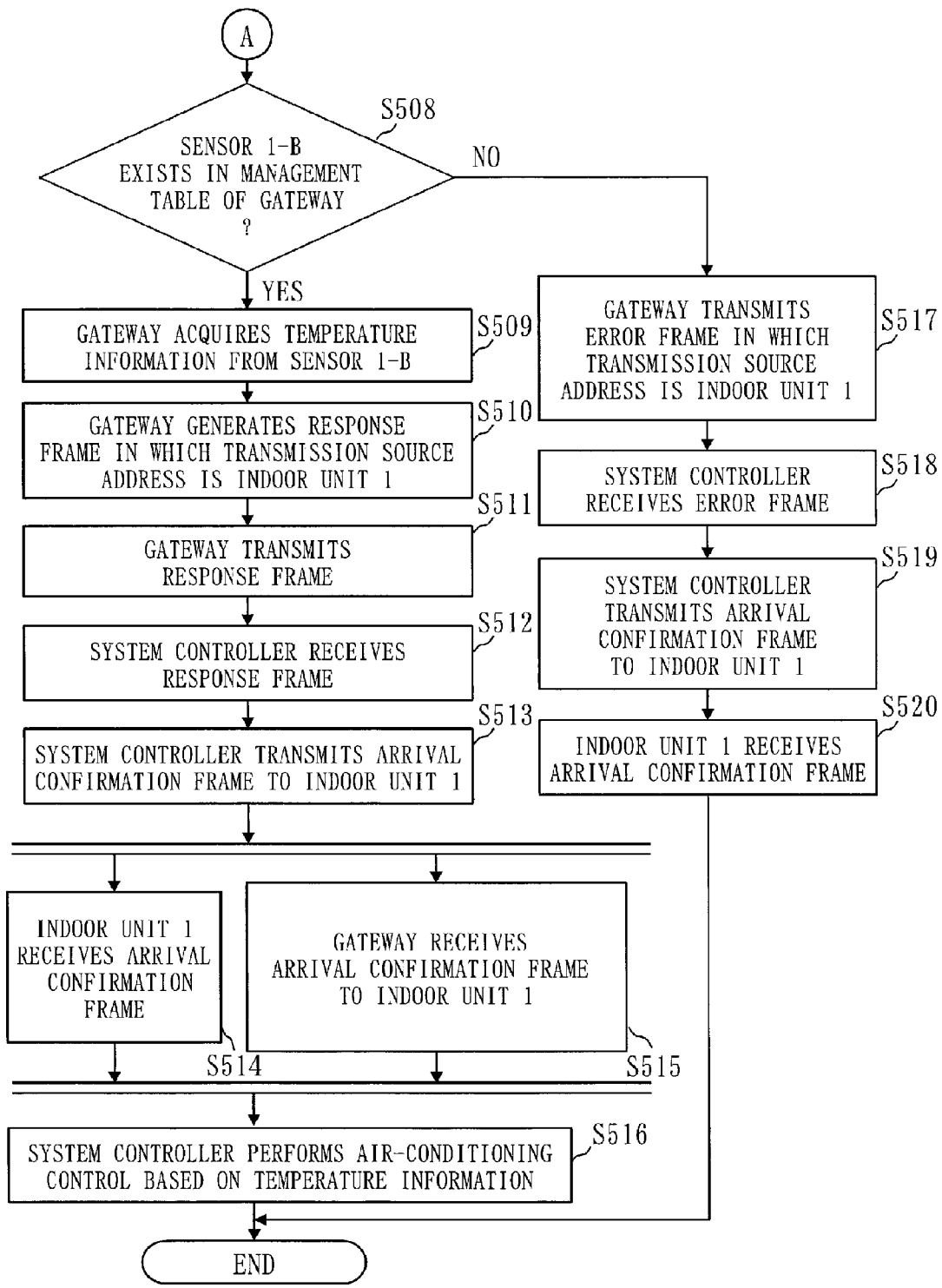
FIG. 6 is a flowchart illustrating a procedure for collecting a measurement value of the sensor 1-B according to the first embodiment.

Next, operational examples when the system controller (101) acquires the temperature information from the gateway apparatus (103) will be described with reference to the flowcharts of FIGS. 5 and 6.

Here, the operational examples when the system controller (101) acquires the temperature information of the sensor 1-B (123) from gateway apparatus (103) will be described.

First, in step 501, to acquire the temperature information of the sensor 1-B (123), the system controller (101) generates a request frame in which SrcAddr=0 and DstAddr=1 are described in the header part.

Next, in step 502, the system controller (101) transmits the request frame to the air-conditioning network (100).

For example, the system controller (101) broadcasts the request frame.

Next, in step 503, the indoor unit 1 (111) receives the request frame.

Next, in step 504, the indoor unit 1 (111) transmits an arrival confirmation frame (ACK) to the air-conditioning network (100).

Next, in step 505, the system controller (101) receives the arrival confirmation frame (ACK), and confirms that the request frame has been delivered to the indoor unit 1 (111).

Next, in step 506, since the indoor unit 1 (111) is not connected with the sensor 1-B (123), the indoor unit 1 (111) does nothing.

In step 507 in parallel with step 503, the network communication unit (1031) of the gateway apparatus (103) receives the request frame addressed to the indoor unit 1 (111).

Next, in step 508, the frame analysis unit (1033) of the gateway apparatus (103) confirms whether the sensor 1-B (123) exists under the management of the gateway apparatus (103).

In other words, the frame analysis unit (1033) determines whether the sensor 1-B (123) is included in the management table (FIG. 3).

When the sensor 1-B (123) exists under the management of the gateway apparatus (103) (YES in step 503), the processing proceeds to step 509.

On the other hand, when the sensor 1-B (123) does not exist under the management of the gateway apparatus (103) (NO in step 503), the processing proceeds to step 517.

In step 509, the gateway apparatus (103) acquires the temperature information from the sensor 1-B (123) which is the additional sensor by wireless communication.

More specifically, the frame generation unit (1034) generates an instruction frame addressed to the sensor 1-B (123), and the sensor communication unit (1032) transmits the instruction frame to the sensor 1-B (123).

Furthermore, the sensor communication unit (1032) receives a notification frame from the sensor 1-B (123).

Next, in step 510, the frame generation unit (1034) of the gateway apparatus (103) generates a response frame in which SrcAddr=1 and DstAddr=0 are described in the header part and the temperature information is described in the payload part.

Next, in step 511, the network communication unit (1031) of the gateway apparatus (103) transmits the response frame to the air-conditioning network (100).

Next, in step 512, the system controller (101) receives the response frame.

Next, in step 513, the system controller (101) transmits, to the air-conditioning network (100), an arrival confirmation frame (ACK) in which SrcAddr=0 and DstAddr=1 are described in the header part.

Next, in step 514, the indoor unit 1 (111) receives the arrival confirmation frame (ACK) from the system controller (101).

Furthermore, in step 515, the network communication unit (1031) of the gateway apparatus (103) receives the arrival confirmation frame (ACK) to the indoor unit 1 (111), and recognizes that the system controller (101) has normally received the response frame.

Next, in step 516, the system controller (101) performs the air-conditioning control based on the temperature information acquired from the received response frame.

In step 517, to notify the system controller (101) of an error, the gateway apparatus (103) transmits an error frame in which the transmission source address is set to the indoor unit 1 (111).

In other words, the frame generation unit (1034) generates the error frame, and the network communication unit (1031) transmits the error frame to the system controller (101).

Next, in step 518, the system controller (101) receives the error frame.

Next, in step 519, the system controller (101) transmits, to the air-conditioning network (100), an arrival confirmation frame (ACK) addressed to the indoor unit 1.

Next, in step 520, the indoor unit 1 (111) receives the arrival confirmation frame (ACK) from the system controller (101).

As described above, according to the embodiment, the gateway apparatus (103) manages the sensors associated with the indoor units, and transmits the response frame in reply to the request frame on behalf of the indoor unit.

Thus, the system controller (101) can collect the information of a large number of sensors.

Furthermore, it is possible to collect the information of the additional sensors without adding, to the indoor unit, a dedicated circuit to be connected to the additional sensors (wireless sensor) and a program to perform a special process.

Moreover, in the present embodiment, the gateway apparatus (103) responds, without confirming that the indoor unit has transmitted the arrival confirmation frame to the system controller (101) (step 504), to the system controller (101) with the temperature information of the additional sensors.

In contrast, the gateway apparatus (103) may respond, after confirming that the indoor unit has transmitted the arrival confirmation frame to the system controller (101) (step 504), to the system controller (101) with the temperature information of the additional sensors.

When this procedure is taken, the temperature information of the additional sensors is not provided from the gateway apparatus (103) unless the indoor unit transmits the arrival confirmation frame in step 504, and the additional sensors are invalidated.

Furthermore, in the present embodiment, the gateway apparatus (103) manages the wireless sensors as the additional sensors, but may manage sensors wiredly connected with the gateway apparatus (103).

Moreover, although the case where the gateway apparatus (103) holds a management table in FIG. 3 has been described in the present embodiment, the gateway apparatus (103) may dynamically generate a management table.

For example, a response state monitoring unit is added to the configuration in FIG. 7. The response state monitoring unit monitors the transmission state of the response frame to the system controller (101) from the indoor unit, and identifies a sensor specified in the request frame to which the response frame has not been transmitted by the indoor unit, as a non-connection sensor.

For example, since the indoor unit 1 (111) transmits the response frame (step 409) when the system controller (101) transmits request frame specifying the sensor 1-A, the response state monitoring unit identifies the sensor 1-A as a connection sensor.

On the other hand, since the indoor unit 1 (111) does not transmit the response frame (step 506) when the system controller (101) transmits the request frame specifying the sensor 1-B, the response state monitoring unit identifies the sensor 1-B as a non-connection sensor if the network communication unit (1031) does not receive the response frame for a predetermined period of time after step 507.

Then, the response state monitoring unit associates the sensor 1-B identified as the non-connection sensor with the indoor unit 1 (111) and adds the sensor in the management table.

Every time the network communication unit (1031) receives a request frame, the frame analysis unit (1033) determines, referring to the management table, whether the sensor specified in the request frame is the non-connection sensor identified by the response state monitoring unit.

Furthermore, a measurement value of a sensor has been used for the purpose of the air-conditioning in the present embodiment, but may be used for purposes other than the air-conditioning.

Moreover, sensors have been used to measure temperature in the present embodiment, but sensors which measure other physical quantities other than temperature may be used.

Finally, a hardware configuration example of the gateway apparatus (103) described in the present embodiment will be described with reference to FIG. 8.

The gateway apparatus (103) is a computer, and can implement elements of the gateway apparatus (103) with programs.

As the hardware configuration of the gateway apparatus (103), an arithmetic device 901, an external storage device 902, a main storage device 903, a communication device 904, and an input/output device 905 are connected with a bus.

The arithmetic device 901 is a CPU (Central Processing Unit) which executes a program.

The external storage device 902 is, for example, a ROM (Read Only Memory), a flash memory, or a hard disk device.

The main storage device 903 is a RAM (Random Access Memory).

The management table storage unit (1035) is implemented by the external storage device 902 or the main storage device 903.

The communication device 904 corresponds to physical layers of the network communication unit (1031) and the sensor communication unit (1032).

The input/output device 905 is, for example, a mouse, a keyboard, a display device, and the like.

The program is normally stored in the external storage device 902, sequentially read in the arithmetic device 901, and executed while being loaded in the main storage device 903.

The program implements the function described as a " . . . unit" illustrated in FIG. 1 (however, except for the management table storage unit (1035), the same applies hereafter).

Furthermore, an operating system (OS) is also stored in the external storage device 902, at least a part of the OS is loaded in the main storage device 903, and the arithmetic device 901 executes the program which implements the " . . . unit" illustrated in FIG. 1 while executing the OS.

Moreover, in the description of the present embodiment, information, data, signal values, and variable values indicating the processing results described as "judgment of . . . ", "determination of . . . ", "analysis of . . . ", "generation of . . . ", "acquisition of . . . ", "monitoring of . . . ", "identification of . . . ", "extraction of . . . ", "setting of . . . ", "registration of . . . ", "selection of . . . ", "reception of . . . " are stored in the main storage device 903 as files.

Figure 8:
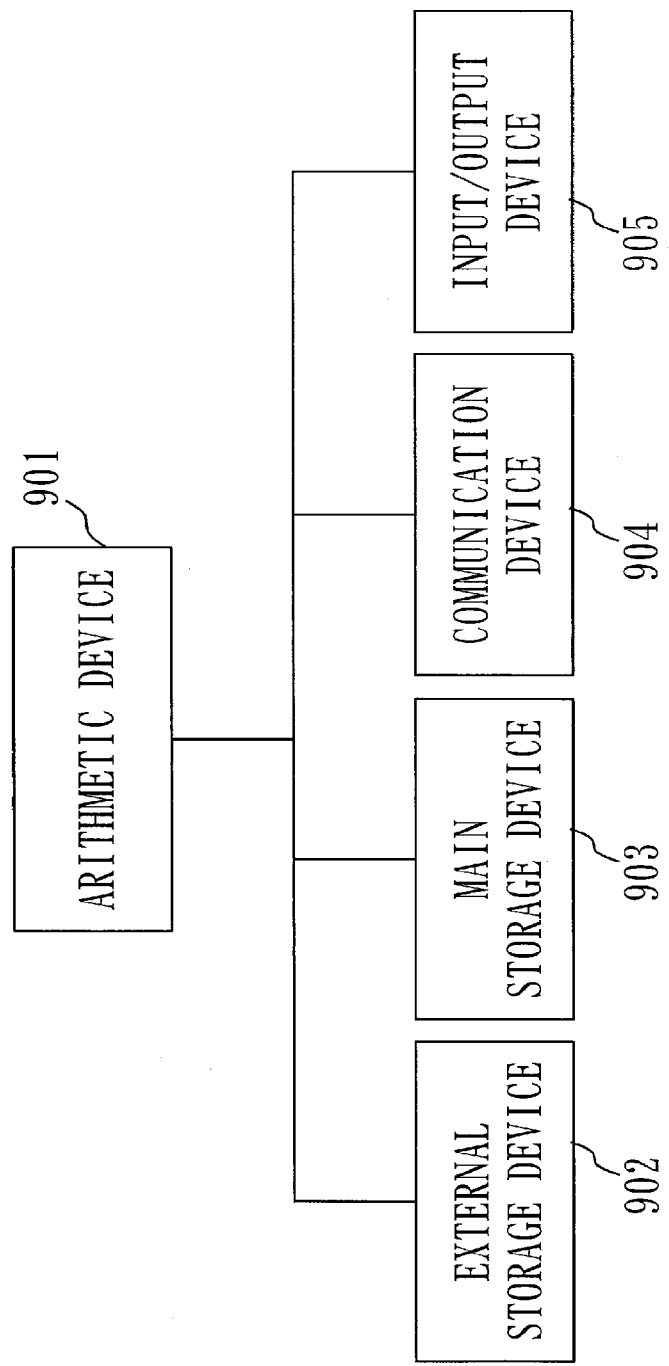
FIG. 8 is a diagram illustrating an example of a hardware configuration of the gateway apparatus according to the first embodiment.

Note that, the configuration of FIG. 8 merely illustrates an example of the hardware configuration of the gateway apparatus (103), and the hardware configuration of the gateway apparatus (103) is not limited to the configuration illustrated in FIG. 8 and may be other configurations.

Furthermore, the procedure described in the present embodiment can implement a communication method according to the present invention.

REFERENCE SIGNS LIST

100: air-conditioning network, 101: system controller, 102: outdoor unit, 103: gateway apparatus, 111: indoor unit 1, 112: indoor unit 2, 121: sensor 1-A, 122: sensor 2-A, 123: sensor 1-B, 124: sensor 1-C, 125: sensor 2-B, 126: sensor 2-C, 1031: network communication unit, 1032: sensor communication unit, 1033: frame analysis unit, 1034: frame generation unit, and 1035: management table storage unit

The invention claimed is:

1. A communication apparatus included in a network in which a device and a collection apparatus to collect a measurement value of a physical quantity used by the device are connected with each other, the communication apparatus comprising:

processing circuitry to:
receive a measurement value transmission request which has been transmitted from the collection apparatus to the device, and specifies either of a connection sensor and a non-connection sensor and requests the device to transmit a measured value of the sensor specified to the collection apparatus, the connection sensor measuring a physical quantity used by the device and being connected to the device, the non-connection sensor measuring a physical quantity used by the device and not being connected to the device;

determine whether the non-connection sensor is specified in the measurement value transmission request;

acquire, when it has been determined that the non-connection sensor is specified in the measurement value transmission request, a measurement value of the non-connection sensor from the non-connection sensor; and transmit, to the collection apparatus, the acquired measurement value of the non-connection sensor in response to the measurement value transmission request.

2. The communication apparatus according to claim 1, wherein the device does not respond to the measurement value transmission request when the connection sensor has not been specified in the measurement value transmission request, and transmits, to the collection apparatus, a measurement value of the connection sensor in response to the measurement value transmission request when the connection sensor has been specified in the measurement value transmission request, and the processing circuitry further monitors a response state from the device to the collection apparatus, identifies that a sensor specified in the measurement value transmission request to which the apparatus does not respond, as the non-connection sensor, and determines whether the identified non-connection sensor is specified in the measurement value transmission request.

3. The communication apparatus according to claim 1, wherein when the device receives the measurement value transmission request, the device transmits, to the collection apparatus, a reception confirmation notification to notify that the measurement value transmission request is received, and the processing circuitry receives, after receiving the measurement value transmission request, the reception confirmation notification transmitted from the device to the collection apparatus, and determines, after the reception confirmation notification is received, whether the non-connection sensor is specified in the measurement value transmission request.

4. The communication apparatus according to claim 3, wherein the processing circuitry does not determine, when the reception confirmation notification is not received, whether the non-connection sensor is specified in the measurement value transmission request.

5. A communication method in a network in which a device and a collection apparatus to collect a measurement value of a physical quantity used by the device are connected with each other, the method comprising:

receiving a measurement value transmission request which has been transmitted from the collection apparatus to the device, and specifies either of a connection sensor and a non-connection sensor and requests the device to transmit a measured value of the sensor specified to the collection apparatus, the connection sensor measuring a physical quantity used by the device and being connected to the device, the non-connection sensor measuring a physical quantity used by the device and not being connected to the device;

determining whether the non-connection sensor is specified in the measurement value transmission request;

acquiring, when it has been determined that the non-connection sensor is specified in the measurement value transmission request, a measurement value of the non-connection sensor from the non-connection sensor; and transmitting, to the collection apparatus, the acquired measurement value of the non-connection sensor in response to the measurement value transmission request.

6. A non-transitory computer readable medium storing a program which causes a computer included in a network in which a device and a collection apparatus to collect a measurement value of a physical quantity used by the device are connected with each other to execute:

reception processing of receiving a measurement value transmission request which has been transmitted from the collection apparatus to the device, and specifies either of a connection sensor and a non-connection sensor and requests the device to transmit a measured value of the sensor specified to the collection apparatus, the connection sensor measuring a physical quantity used by the device and being connected to the device, the non-connection sensor measuring a physical quantity used by the device and not being connected to the device;

sensor determination processing of determining whether the non-connection sensor is specified in the measurement value transmission request;

measurement value acquisition processing of acquiring, when it has been determined in the sensor determination processing that the disconnection sensor is specified in the measurement value transmission request, a measurement value of the non-connection sensor from the non-connection sensor; and transmission processing of transmitting, to the collection apparatus, the measurement value of the non-connection sensor acquired in the measurement value acquisition processing in response to the measurement value transmission request.

* * * * *